G. A. LYON.
BUFFER DISPLAY STAND.
APPLICATION FILED OCT. 5, 1921.
1,436,991.   Patented Nov. 28, 1922.
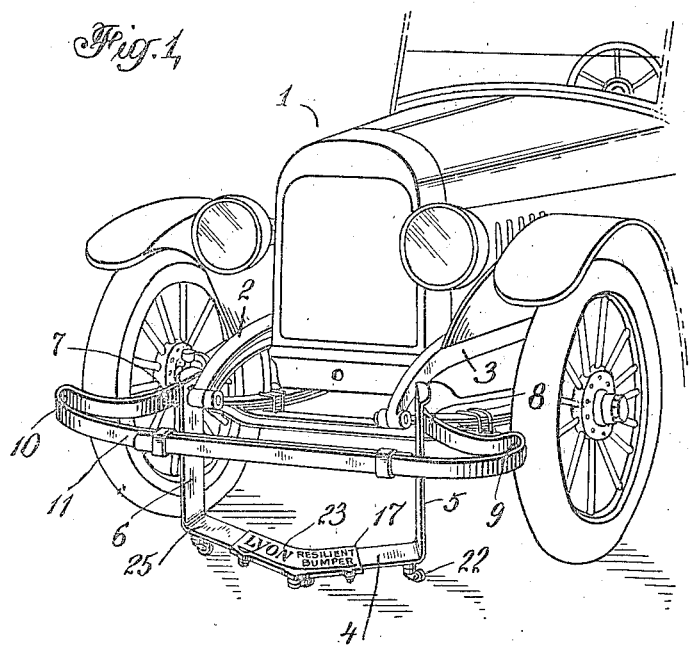
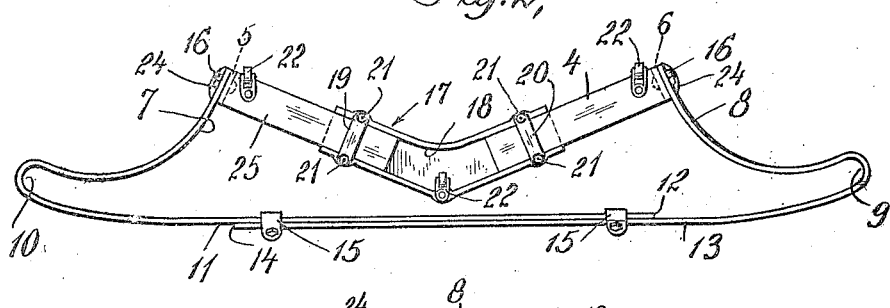
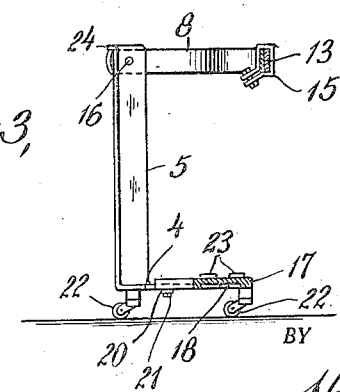
INVENTOR.
George Albert Lyon
BY
Harry L Duncan
ATTORNEY.

Patented Nov. 28, 1922.

1,436,991

UNITED STATES PATENT OFFICE.

GEORGE ALBERT LYON, OF PHILADELPHIA, PENNSYLVANIA.

BUFFER-DISPLAY STAND.

Application filed October 5, 1921. Serial No. 505,469.

*To all whom it may concern:*

Be it known that I, GEORGE ALBERT LYON, a citizen of the United States, and resident of Philadelphia, county of Philadelphia, State of Pennsylvania, have made a certain new and useful invention relating to Buffer-Display Stands, of which the following is a specification taken in connection with the accompanying drawing.

This invention relates especially to display devices or stands for automobile buffers by which the buffer of any suitable type, such as the Lyon resilient strip type of buffer, may be mounted on the movable stand and if desired adjusted in width so that the buffer may be moved adjacent or against the automobile front and brought into substantially proper relation to the automobile front frame members or goose necks. The display stand may advantageously comprise a channelled base with which end brackets may co-operate so as to be adjustably or otherwise connected thereto. These end brackets may be formed of steel strip or other suitable material and preferably comprise substantially vertical side members to which the attaching members of the buffer may be secured.

In the accompanying drawing showing in a somewhat diagrammatic way an illustrative embodiment of this invention Fig. 1 is a perspective view showing the automobile front and display stand and buffer in co-operation therewith.

Fig. 2 is a bottom view of the bracket and buffer and

Fig. 3 is a vertical sectional view thereof.

The display stand or device may advantageously comprise a movable base of any suitable construction provided with one or more suitable casters or rollers and preferably having adjustable connection with the end brackets or side members to which the buffer may be secured. As shown in Figs. 1 and 2, the base may advantageously comprise the channelled member 17 of cast iron or other suitable material, the lower portion of which may be formed with the guiding channels or members 18 adapted to co-operate with the end brackets 4, 25 which may be adjustably clamped thereto if desired by the connecting devices 19, 20 fastened in position by the bolts 21. A front centre caster or movable support 22 is preferably arranged near the front of this base which is advantageously given an angular form, as shown, and of course the top of this base member may be formed with any suitable ornamentation or designation such as 23.

The end brackets co-operating with this base may advantageously be formed of strips of spring steel or other suitable material, each having an end bracket 4 engaging the channel in the base and having an upstanding side member 5 which may be substantially vertical and formed with an aligning flange 24 adjacent its top which may be provided with one or more bolt holes to connect the buffer attaching members thereto. The other end bracket 25 may have a similar substantially vertical side member 6 and additional roller bearings or casters 22 may be mounted on these end brackets preferably adjacent the rear edges thereof to give a desirable three-point support enabling the entire display device to be moved over the floor of the salesroom or other support on which an automobile is standing.

As shown in Figs. 2 and 3, a buffer of the general Lyon type may be readily connected to this display stand by bolts or connecting devices 16 passing through or around the attaching members 7, 8 of the buffer and rigidly connecting it to the flanged side members 5, 6 of the display stand. In this way the buffer is securely and movably supported at about the proper height and its end loops 9, 10 and buffer front portions may be brought into substantially proper position with respect to the goose necks 2, 3 of an automobile 1 so that the appearance of different styles or shapes of buffers can be readily appreciated or compared by customers or automobile owners. Furthermore, in the case of adjustable front buffers of the type indicated, where the adjustable connecting devices 15 enclose the front strips 11, 13 so that by loosening these clips adjacent the ends 12, 14 of the strips, the width of the buffer front may be adjusted, the display stand may be similarly adjusted in width by loosening its connecting devices 19, 20 and adjusting the end brackets 4, 25 with respect to the base 17 so that the elements of the display stand may be rigidly connected in such position as to properly support the buffer with any ordinary width adjustment. This adjustable connection between parts of the display stand also facilitates the packing and shipping thereof since the parts may be disconnected and the two end brackets more or less fitted or nested together which greatly minimizes the size of package.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims.

I claim:

1. The buffer display stand adapted for use with adjustable width automobile buffers of the Lyon type, comprising a cast iron angular base channelled on its lower surface and provided adjacent its front central portion with a caster, clamping connecting devices co-operating with the channels adjacent each end of said base, and brackets of steel strip fitting into the channels of said base and extending outward and rearward from said base to be disengageably and adjustably connected therewith and each having a caster adjacent its rear portion and a substantially vertical side member projecting upward therefrom and formed with an aligning flange and attaching devices adjacent its upper end to be connected with a buffer attaching member and support the same at substantially the operative height in connection with an automobile front.

2. The movable buffer display stand adapted for use with adjustable width automobile buffers of the Lyon type, comprising an angular base provided adjacent its front central portion with a support, and end brackets of strip metal extending outward and rearward from said base and adjustably connected therewith and each having a support adjacent its rear portion and a side member projecting upward therefrom and formed with aligning and attaching devices adjacent its upper end to be connected with a buffer attaching member and support the same at substantially the operative height in connection with an automobile front.

3. The movable buffer display stand adapted for use with adjustable width automobile buffers of the Lyon type, comprising a base, and end brackets extending outward and rearward from said base and adjustably connected therewith and each having a side member projecting upward therefrom to be connected with a buffer attaching member and support the same at substantially the operative height in connection with an automobile front.

4. The buffer display stand adapted for use with adjustable width automobile buffers of the Lyon type, comprising a cast iron angular base provided adjacent its front central portion with a caster, end brackets of steel strip extending outward and rearward from said base and disengageably and adjustably connected therewith and each having a caster adjacent its rear portion and a substantially vertical side member projecting upward therefrom and formed with an aligning flange and attaching devices adjacent its upper end to be connected with a buffer attaching member and support the same at substantially the operative height in connection with an automobile front.

5. The buffer display stand adapted for use with adjustable width automobile buffers of the Lyon type, comprising a cast iron angular base provided adjacent its front central portion with a caster, end brackets of steel strip extending outward and rearward from said base and adjustably connected therewith and each having a caster adjacent its rear portion and a side member projecting upward therefrom and formed with attaching devices adjacent its upper end to be connected with a buffer attaching member and support the same at substantially the operative height in connection with an automobile front.

6. The buffer display stand adapted for use with adjustable width automobile buffers of the Lyon type, comprising an angular base, and connected end brackets of steel strip extending outward and rearward from said base and each having a substantially vertical side member projecting upward therefrom, and aligning flanges and attaching devices adjacent the upper ends of said side members to connect thereto buffer attaching members and support the connected buffer front at substantially the operative height in connection with an automobile front.

GEORGE ALBERT LYON.